US010412108B2

(12) United States Patent
LaRosa et al.

(10) Patent No.: US 10,412,108 B2
(45) Date of Patent: *Sep. 10, 2019

(54) SYSTEM FOR DETECTING FRAUDULENT ELECTRONIC COMMUNICATIONS IMPERSONATION, INSIDER THREATS AND ATTACKS

(71) Applicant: Verrafid LLC, Celebration, FL (US)

(72) Inventors: Vincent Jay LaRosa, Celebration, FL (US); Christopher H. York, Sr., Kensington, NH (US)

(73) Assignee: Verrafid LLC, Celebration, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 16/119,305

(22) Filed: Aug. 31, 2018

(65) Prior Publication Data
US 2019/0028503 A1 Jan. 24, 2019

Related U.S. Application Data

(63) Continuation of application No. 15/442,887, filed on Feb. 27, 2017, now Pat. No. 10,116,678.
(Continued)

(51) Int. Cl.
H04L 29/06 (2006.01)
G06Q 30/00 (2012.01)
(Continued)

(52) U.S. Cl.
CPC ...... H04L 63/1425 (2013.01); G06F 17/2775 (2013.01); G06Q 30/0185 (2013.01);
(Continued)

(58) Field of Classification Search
CPC . H04L 63/1425; H04L 51/12; H04L 61/1511; H04L 63/1441; G06F 17/2775
(Continued)

(56) References Cited

U.S. PATENT DOCUMENTS 7,634,810 B2  12/2009 Goodman et al.
8,752,172 B1   6/2014 Dotan et al.
(Continued)

OTHER PUBLICATIONS

Richard A. Becker, Chris Volinsky, and Allan R. Wilks "Fraud Detection in Telecommunications: History and lessons Learned", vol. 52, No. 1, pp. 20-33, Feb. 2010. (Year: 2010).*
(Continued)

Primary Examiner — Ghodrat Jamshidi
(74) Attorney, Agent, or Firm — Burns & Levinson, LLP; Joseph M. Maraia

(57) ABSTRACT

A system for detecting fraudulent emails from entities impersonating legitimate senders that are intended to cause the recipients to unknowingly conduct unauthorized transactions, for example, transferring funds or divulging sensitive information. The system monitors emails being sent from and received at the protected domain to detect suspected fraudulent emails. The emails are monitored for, among other aspects, linguistic variations, changes in normal patterns of email communications, new or unfamiliar source domains. Suspicious emails can be held and flagged for later review, discarded or passed through with an alert raised indicating a review is needed.

13 Claims, 6 Drawing Sheets

Related U.S. Application Data

(60) Provisional application No. 62/299,698, filed on Feb. 25, 2016.

(51) Int. Cl.
  *H04L 12/58* (2006.01)
  *G06F 17/27* (2006.01)
  *H04L 29/12* (2006.01)
  *G10L 15/02* (2006.01)

(52) U.S. Cl.
  CPC .............. *G10L 15/02* (2013.01); *H04L 51/12* (2013.01); *H04L 61/1511* (2013.01); *H04L 63/1441* (2013.01); *G10L 2015/025* (2013.01); *G10L 2015/027* (2013.01)

(58) Field of Classification Search
  CPC ................ G06Q 30/0185; G10L 15/02; G10L 2015/025; G10L 2015/027
  See application file for complete search history.

(56) References Cited

U.S. PATENT DOCUMENTS

| | | | | |
|---|---|---|---|---|
| 8,782,781 | B2* | 7/2014 | Dulitz | H04L 51/12 726/22 |
| 9,607,620 | B2* | 3/2017 | Jones | G10L 17/22 |
| 9,686,308 | B1* | 6/2017 | Srivastava | H04L 51/12 |
| 2004/0225640 | A1* | 11/2004 | Brown | G06Q 10/107 |
| 2005/0228899 | A1* | 10/2005 | Wendkos | H04L 51/12 709/232 |
| 2007/0078973 | A1* | 4/2007 | Kussmaul | G06Q 10/107 709/224 |
| 2009/0125602 | A1* | 5/2009 | Bhatia | G06Q 10/107 709/207 |
| 2011/0153752 | A1* | 6/2011 | Seaman | G06Q 10/107 709/206 |
| 2012/0131107 | A1* | 5/2012 | Yost | H04L 51/12 709/206 |
| 2012/0216040 | A1 | 8/2012 | Tanamy et al. | |
| 2014/0067942 | A1 | 3/2014 | Carrigan et al. | |
| 2014/0229407 | A1* | 8/2014 | White | G06Q 10/10 706/12 |
| 2015/0026027 | A1 | 1/2015 | Priess et al. | |
| 2015/0134389 | A1 | 5/2015 | Punera et al. | |
| 2016/0080403 | A1 | 3/2016 | Cunningham et al. | |
| 2016/0164819 | A1* | 6/2016 | Shrivastava | H04L 51/24 709/206 |
| 2016/0226811 | A1* | 8/2016 | Kerschhofer | H04L 51/26 |
| 2017/0093787 | A1* | 3/2017 | Harihara Iyer | H04L 51/12 |
| 2017/0161364 | A1 | 6/2017 | Clark et al. | |
| 2017/0230323 | A1 | 8/2017 | Jakobsson | |

OTHER PUBLICATIONS

"Malware Theats and Mitigation Stratigies" US-CERT Informatin Whitepaper, May 16, 2005 , Produced by: Mutli-State Information Sharing and Analysis Center and United State Computer Emergency Readiness Team. (Year: 2005).*

Amos Azaria, Ariella Richardson, Sarit Kraus and V.S. Subrahmanian "Behavioral Analysis of Insider Threat: A Survey and Bootstrapped Prediction in Imbalanced Data", pp. 1-22, 2014. (Year: 2014).*

"Spoofed email display name/Exchange 2016;" http://markgossa.blogspot.com/2016/01/spoofed-email-display-name-exchange-2016.html; Jan. 11, 2016; 6 pages.

Gunter Ollmann; "The Phishing Guide;" IBM Internet Security Systems; 2007; 72 pages.

* cited by examiner

SYSTEM FOR DETECTING FRAUDULENT ELECTRONIC COMMUNICATIONS IMPERSONATION, INSIDER THREATS AND ATTACKS

RELATED APPLICATION

This application is a continuation of U.S. non-provisional patent application Ser. No. 15/442,887 filed on Feb. 27, 2017 entitled "System For Detecting Fraudulent Electronic Communications Impersonation, Insider Threats And Attacks" which is a U.S. non-provisional application claiming priority to U.S. Provisional Patent Application No. 62/299,698, filed Feb. 25, 2016, entitled "System for Detecting And Preventing Electronic Communications Impersonation and Insider Threats," each of which is incorporated by reference in its entirety for all purposes.

BACKGROUND OF THE INVENTION

In today's world, electronic communications, such as email messages, are used to conduct business transactions every day. These electronic communications have become an accepted and adopted method for performing critical and trusted transactions such as, for example, facilitating the setup of payments, facilitation of sensitive data transfers, contracts negotiations, intellectual property research and development and business planning and strategy. This increase in the reliance on electronic communications as a mechanism to facilitate money transfers, however, has led to a dramatic rise in criminals and insiders taking advantage of the implicit trust that exists in our social networks today.

As known, there are a number of different types of attacks on businesses to try to fraudulently obtain information and/or money.

Criminals routinely trick people into communicating with another outside party who is privy to the conversations and social relationships that exist in a corporate environment. Here, the external criminal enters into an in-progress communication, or starts a new conversation with some context of the social relationship, in order to convince the person inside the target company to take an action that will benefit the criminal. This could be a wire transfer or to change a bank account number on a pending payment.

Attackers analyze organizations to identify users who process financial routing instructions to facilitate payments as part of their positions, e.g., CFOs or those working in accounts payable, accounts receivable, procurement, etc. Attackers "phish" these users to infect their computers with malware, in some cases to gain access to their email inbox, to identify in progress financial transactions.

Once attackers have the transactions identified, the criminals will create "similar" email addresses and domains in an attempt to fool their targets. For example, where the actual email address is: jim.weeble@hesiercorp.com, the fake email is presented as: jim.weeble@heseircorp.com. (Note the transposed letters in the latter domain name.)

After the domains are created, the criminal will set up rules to auto-forward the real email address to the fake email address to intercept any real communications.

The fake user will then "proxy" the communications from the real user through the fake email address but will change the payment instructions when the time comes for a funds transfer.

There are also different known scams including "The Bogus Invoice Scheme," "The Supplier Swindle," and "The Invoice Modification Scheme," where a business, which often has a long standing relationship with a supplier, is asked to wire funds for invoice payment to an alternate, fraudulent account.

There are also the "CEO," "Business Executive Scam," "Masquerading," and "Financial Industry Wire" frauds where e-mail accounts of high-level business executives, e.g., CFO, CTO, etc., are compromised. A request for a wire transfer from the compromised account is made to a second employee within the company who is normally responsible for processing these requests. In some instances, a request for a wire transfer from the compromised account is sent directly to the financial institution with instructions to urgently send funds to bank "X" for reason "Y."

There are also threats from insider malfeasance where individuals may become "privy" to communications and business related activity regarding information such as, for example, but not limited to, competitive intelligence and intellectual property, that could be leveraged through an external relationship. As a result, electronic communications may be used to pass along this information to outsiders for misuse.

Known approaches to preventing or detecting these problems, however, have gaps that make them inadequate for the task of securing financial, and other, resources. While keywords (financial triggers) can be detected, known approaches cannot detect historical activity in context with requests being made. While some approaches may quarantine email with spam detection engines, attackers may own the DNS domain being used and can set up SPF, DMARC and DKIM records coinciding with their domain to make them appear to be legitimate.

Users can be educated and trained to look for odd context, out of place activity or dis-similar email addresses. Fraudsters, however, may have access to a user's inbox giving them extensive knowledge of past activity to socially engineer the target or victim.

Spam engines may stop some of the phishing email from making it to the user. An attacker, however, may control the user's inbox allowing them to send and receive messages to train the spam engine so the emails are perceived as being valid.

What is needed is a better way to prevent fraudulent email communications from making their way through to a user.

SUMMARY

In one aspect, an apparatus for characterizing communications going to and from a first domain comprises: a processor; and a memory containing program instructions that when executed by the processor cause the processor to manage a fraudulent communications detection system and to, for a predetermined time period, obtain each communication going to and from the first domain and, for each obtained communication: analyze one or more parameters of the obtained communication; store the analyzed one or more parameters of the obtained communication with respect to a sender of the obtained communication and one or more recipients of each obtained communication; identify one or more relationships among the sender and the one or more recipients of the obtained communication; extrapolate and characterize each of the identified one or more relationships as a function of the analyzed one or more parameters; and update a store of extrapolated relationships and associated characterizations of communications among the sender and the one or more recipients of the obtained communication, wherein the store of extrapolated relationships and associated characterizations of communications among the sender and the one or more recipients is operative to improve the fraudulent communications detection system associated with the processor.

In another aspect, an apparatus for characterizing a communication going to or coming from a first domain comprises a processor; and a memory containing program instructions that when executed by the processor cause the processor to manage a fraudulent communications detection system and, for each communication going to or coming from the first domain, to: analyze one or more parameters of the communication; identify one or more relationships among the sender and the one or more recipients of the communication; extrapolate and characterize each of the identified one or more relationships as a function of the analyzed one or more parameters; compare the analysis of the one or more parameters and the extrapolated and characterized relationships to a store of extrapolated relationships and associated characterizations of previously received or sent communications associate with the first domain; generate a risk score for the communication as function of the comparison to the stored relationships and associated characterizations; and process the communication as function of a comparison of the generated risk score to one more predetermined threshold values comprising: an alerting threshold value, a notification threshold value, and a communications labeling threshold value.

BRIEF DESCRIPTION OF THE DRAWINGS

Various aspects of at least one embodiment of the present invention are discussed below with reference to the accompanying figures. It will be appreciated that for simplicity and clarity of illustration, elements shown in the drawings have not necessarily been drawn accurately or to scale. For example, the dimensions of some of the elements may be exaggerated relative to other elements for clarity or several physical components may be included in one functional block or element. Further, where considered appropriate, reference numerals may be repeated among the drawings to indicate corresponding or analogous elements. For purposes of clarity, not every component may be labeled in every drawing. The figures are provided for the purposes of illustration and explanation and are not intended as a definition of the limits of the invention. In the figures.

DETAILED DESCRIPTION

Figure 1:
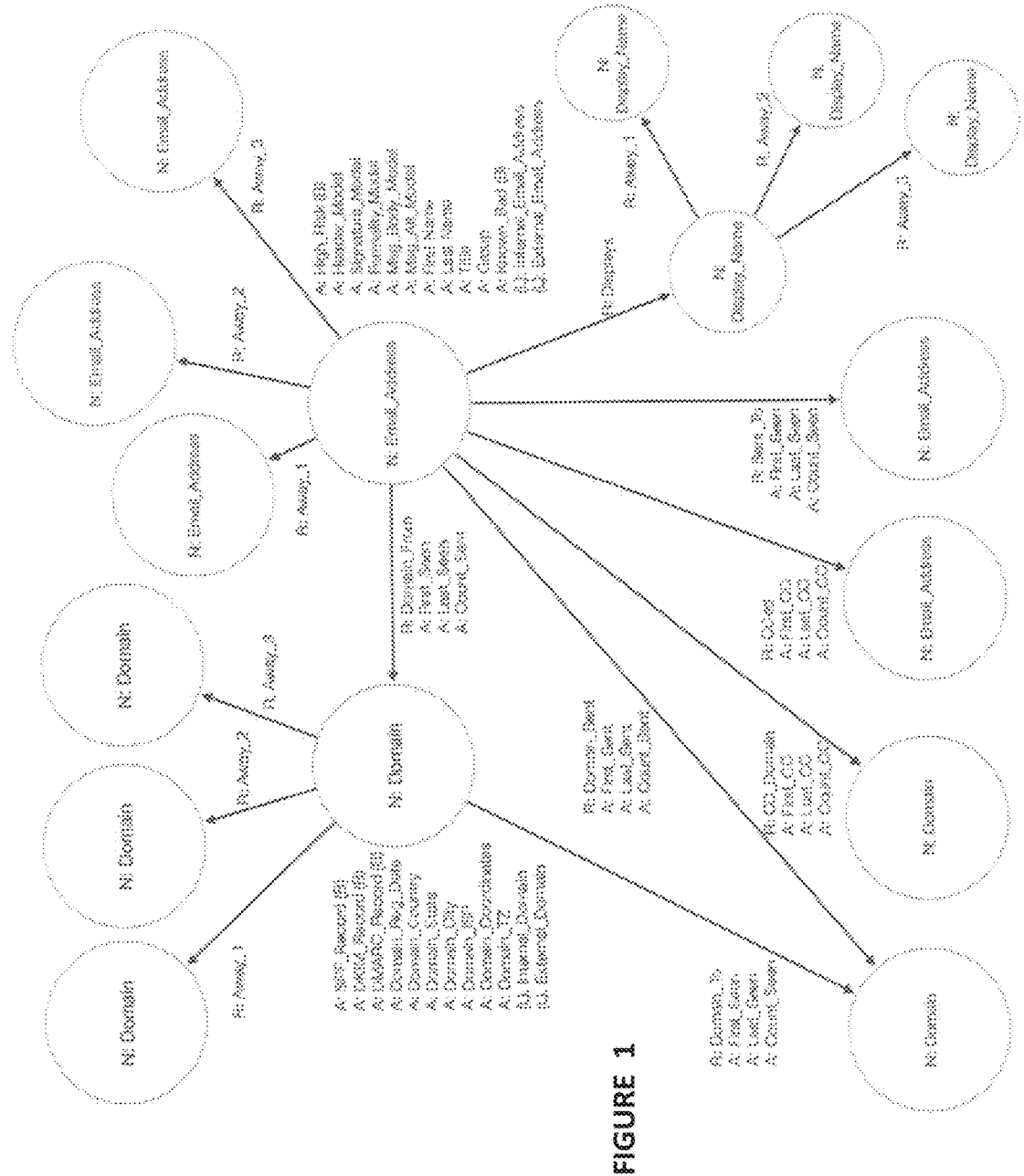
FIG. 1 is a graph representing relationships among domains and email addresses in accordance with an aspect of the present disclosure.

This application is a continuation of U.S. non-provisional patent application Ser. No. 15/442,887 filed on Feb. 27, 2017 entitled "System For Detecting Fraudulent Electronic Communications Impersonation, Insider Threats And Attacks" which is a U.S. non-provisional application claiming priority to U.S. Provisional Patent Application No. 62/299,698, filed Feb. 25, 2016, entitled "System for Detecting And Preventing Electronic Communications Impersonation and Insider Threats" each of which is incorporated by reference in its entirety for all purposes.

In the following detailed description, numerous specific details are set forth in order to provide a thorough understanding of the embodiments of the present invention. It will be understood by those of ordinary skill in the art that these embodiments of the present invention may be practiced without some of these specific details. In other instances, well-known methods, procedures, components and structures may not have been described in detail so as not to obscure the embodiments of the present invention.

Prior to explaining at least one embodiment of the present invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein are for the purpose of description only and should not be regarded as limiting.

Generally, the present system combats fraudulent activities, for example, but not limited to, the electronic communications impersonation and insider threat problems with the following functional capabilities. These capabilities detect and prevent electronic communications intended to impersonate legitimate business contacts in order to facilitate social engineering schemes against the trusted party for any potential motives, not just financial transactions. In addition, the system detects confidential and sensitive information being sent to new parties with no/low previous communications patterns indicating there has been no previous business relationship.

These functions include, but are not limited to:

a. being placed in-line with receiving electronic communications for any combination of detection, prevention, labeling of messages, or alerting;

b. passively monitoring the electronic communications for detection and alerting without prevention capabilities;

c. learning the linguistics used in electronic communications patterns of the respective parties' communications over time;

d. profiling electronic communications creating patterns of behavior from the various elements of the electronic communications identifying risk elements of the communications used to determine impersonations of the communications;

e. learning the business relationship network of communications over time for use in the detection and prevention mechanisms;

f. creating learned communications analytics of the parties' conversations over time to establish behavioral norms for comparison;

g. learning communication identities for distance scoring (how many character differences exist) of identities in real time to be used in the communications profiling;

h. allowing for new communications behavioral analytics to be added, thus providing extensibility;

i. scoring all activity occurring in real-time using multiple parameters to identify thresholds of risk for actions to be taken; and j. using the risk score parameters in an actions engine in any combination to determine alerting thresholds, notification thresholds, labeling of messages for other integration actions and blocking of communications.

The system also includes the following features and corresponding benefits:

a. learning identities participating in communications over time results in a learned pattern for graphing comparisons to recognize new electronic communications for profiling over time;

b. learning content based analytics used in communications between parties over time provides communications patterns that are dissected to detail relevant "hot patterns" relating to known targeted electronics communications by criminals based on specific organizational threats;

c. learning business relationship networks of communications relating to situational business activity over time provides business relationships networks that are created to identify working behavior groups relating to "hot patterns" for comparative analytics based on specific organizational threats; and d. customizing identity comparison capabilities highlighting minor deviations of, for example, identity spelling provides for electronics communications comparisons done against existing learned networks of communications to identify new additions to business relationship networks which are participating in "hot pattern" conversations with identities with minor deviations from existing business relationship network participants for threat detection using distance based analytics.

Advantageously, the present system allows for modifications and updates, for example, new functions can be added as either new threats, or new types of threats, are identified, as well as for fine tuning of existing threat detection approaches.

Customizable scoring of suspicious behavior in order to trigger actions to be taken is provided. A rules engine provides for customized alerting based on user defined thresholds that are based on organizational risk tolerance.

The present system detects human impersonation within electronic communications through business communications network modeling and analytics. The system learns business interactions and communications behaviors, then detects the presence of outside parties, possibly criminal, trying to impersonate one or more trusted external parties who have an existing legitimate business relationship with the internal party. The system learns, over time, legitimate business relationships and learns the types of relationships. Then the system detects when someone is inferring themselves into that relationship, that is, pretending to be someone they are not, and trying to take advantage of the specific type of relationship, for example, improper funds manipulations.

Advantageously, this platform detects and prevents electronic communications impersonation and insider threat communications by a combination of social network graph communications analysis, coupled with algorithms designed to profile and learn the communications patterns and linguistics used in the electronic communications in corporate social circles. A linguistics-profiling engine analyzes both the spoken communications as well as any included attachments containing machine-readable text. As the communications occur, the social network is learned and continuously updated with all of the relevant parameters of the individuals communicating with each other. For example, things like frequency of the communications, geographic information and time zones.

As the social networks are created, simultaneously the linguistics profiling of the messages and attachments are occurring. As the text is extracted, Ngram creation occurs creating a labeled and graphed relationship of the communications directionally from the sender to the recipient of both the spoken communications and any attachments. As is known, an Ngram (sometimes n-gram) is a contiguous sequence of n items from a given sequence of text or speech. The items can be phonemes, syllables, letters, words or base pairs according to the application. The Ngrams typically are collected from a text or speech corpus. As the linguistics engine profiles communications directionally, terminology is graphed out with corresponding words and phrases 1-5 layers deep. As the Ngrams are created, a corpus database is consulted of pre-built terms and phrases supplied both by the users of the system and the makers of the system using statistical and comparative analysis of the terms and the distance of the terms from similar terms, e.g., applying the Levenshtein distance algorithm, to proactively predict the types of communications these terms are related to so they can be contextually labeled, for example, money transfer, mergers and acquisitions, product development, etc. As the linguistics profiling occurs and labels and weights are assigned to the linguistics profiles based on the importance of certain phrases and terms, this increases the relative importance of the types of linguistic communications occurring in the conversations to be used in the scoring process for prevention of criminal activity.

The labeling process is one component allowing the users of the system to build in self-supplied linguistics intelligence relating to, for example, key documents and terminology being used inside an environment that should be contained within a first social circle. The detection of references to these key document in communications between someone in the first social circle and one outside of it may signify an insider is leaking critical information. This transmission could then be blocked for later review as being a potential insider threat.

In the context of impersonation, three things will unfold that need detection, the first is that an outsider is starting to communicate with internal individuals with whom they have had no, or only a minimal, past relationship with. This in itself raises a concern but may not be strong enough, by itself, to justify blocking communications.

Second, as the communications begin to occur, a social inference into the internal individual's targeted circle will begin to occur. This is the establishment of trust. This social circle will ultimately contain, or have the ability to get or change what the outsider is targeting, so establishing trust is crucial. A pre-built corpus of linguistic communications behaviors will be supplied with the system for comparative analytics against, plus a user-supplied list of key individuals who hold power within the organization will be supplied, for example, CEO, CFO, accounts payable employees, etc. This corpus will be used to predict when an outsider is attempting to prove they are who they say they are, or are assuming responsibility for something going forward.

A third aspect requiring detection in this scenario is the "ask." Once the outsider has established communications and gained the trust of the insider, the last step is getting the insider to take action on the objective controlled by the insider. This could be to transfer documents, divulge intelligence, or to facilitate a change to a payment account for a wire transfer.

In the scenarios described above, the system will use a scoring engine to assign weighted values to aspects of the detection engines. This includes the social network profiling engines and the linguistics profiling engines. Ultimately, a combination of the scoring algorithms in conjunction with each other to detect and prevent fraudulent communications or communication from an inside threat will be based on the learned behaviors from the social networks, including what is communicated in the social networks. A risk level acceptable to an organization before electronic messages are blocked, or required to be reviewed by internal investigators, is then determined.

In one embodiment, a system is running an email server software and is configured to be positioned "inline" in order to monitor email communications.

The email server "queue and modify" capabilities are configured to allow for integration with an email content analytics engine to implement the content acquisition capability to create the social network graph analytics from email messages flowing there through. In addition, the flow of email is controlled in the event a message is identified as fraudulent and needs to be blocked or held for review before passing to the intended recipient, as represented in FIGS. 5 and 6.

Figure 5:
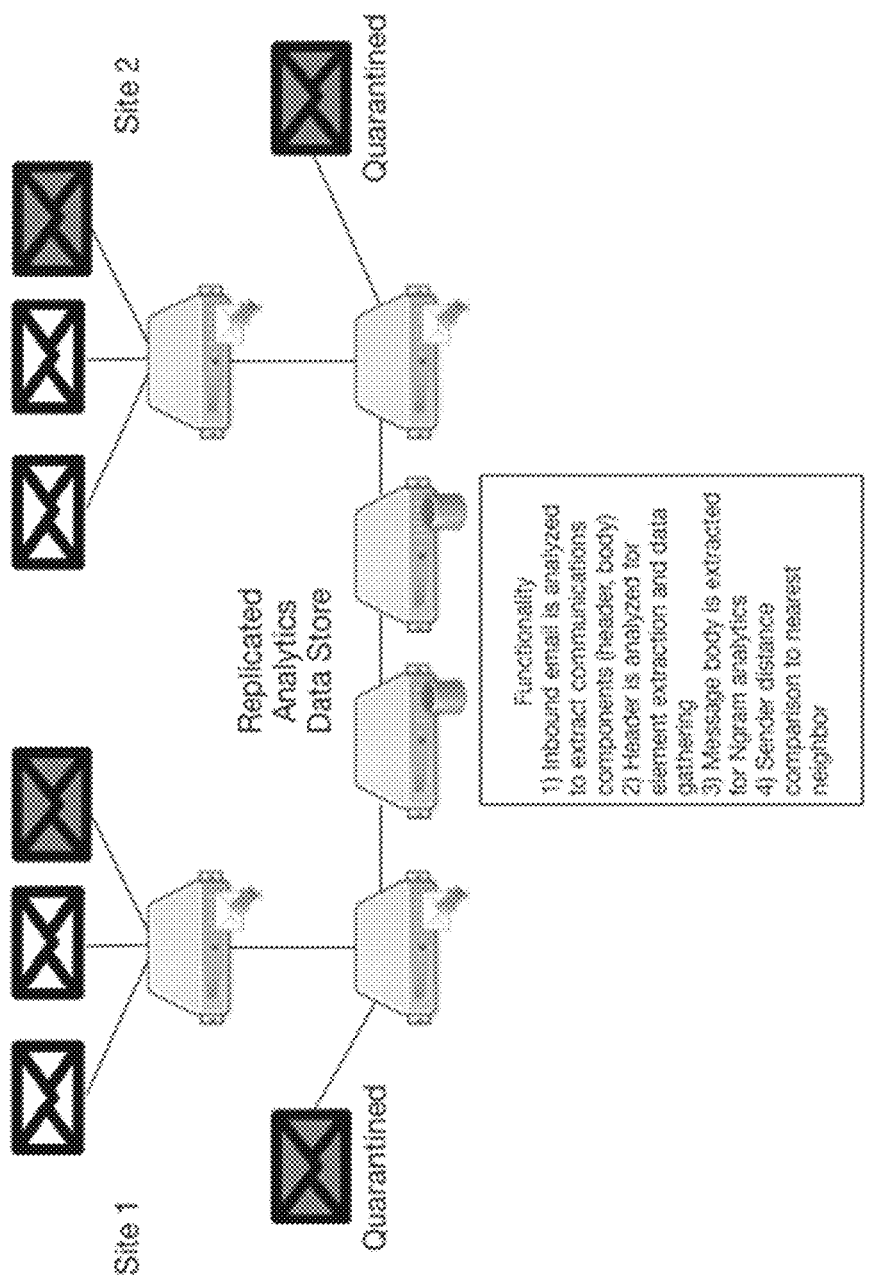
FIG. 5 is a block diagram of a system in accordance with an aspect of the present disclosure.
Figure 6:
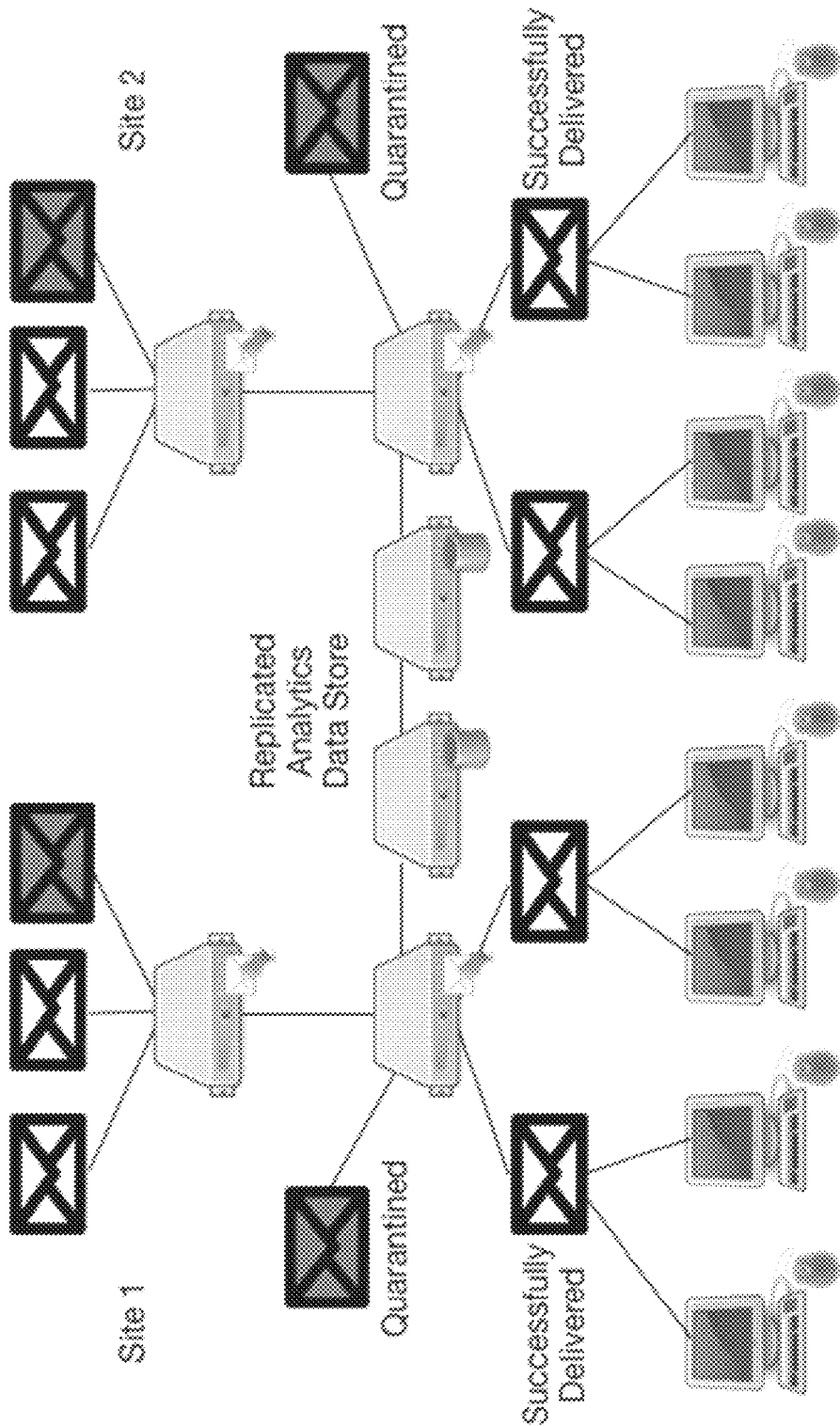
FIG. 6 is a block diagram of a system in accordance with an aspect of the present disclosure.

Thus, as presented in FIG. 5, inbound email is analyzed to extract communications components, e.g., header and body information. The header information is analyzed for element extraction and data-gathering. The message body is extracted for Ngram analytics. A sender distance comparison to a nearest neighbor is also implemented.

Figure 3:
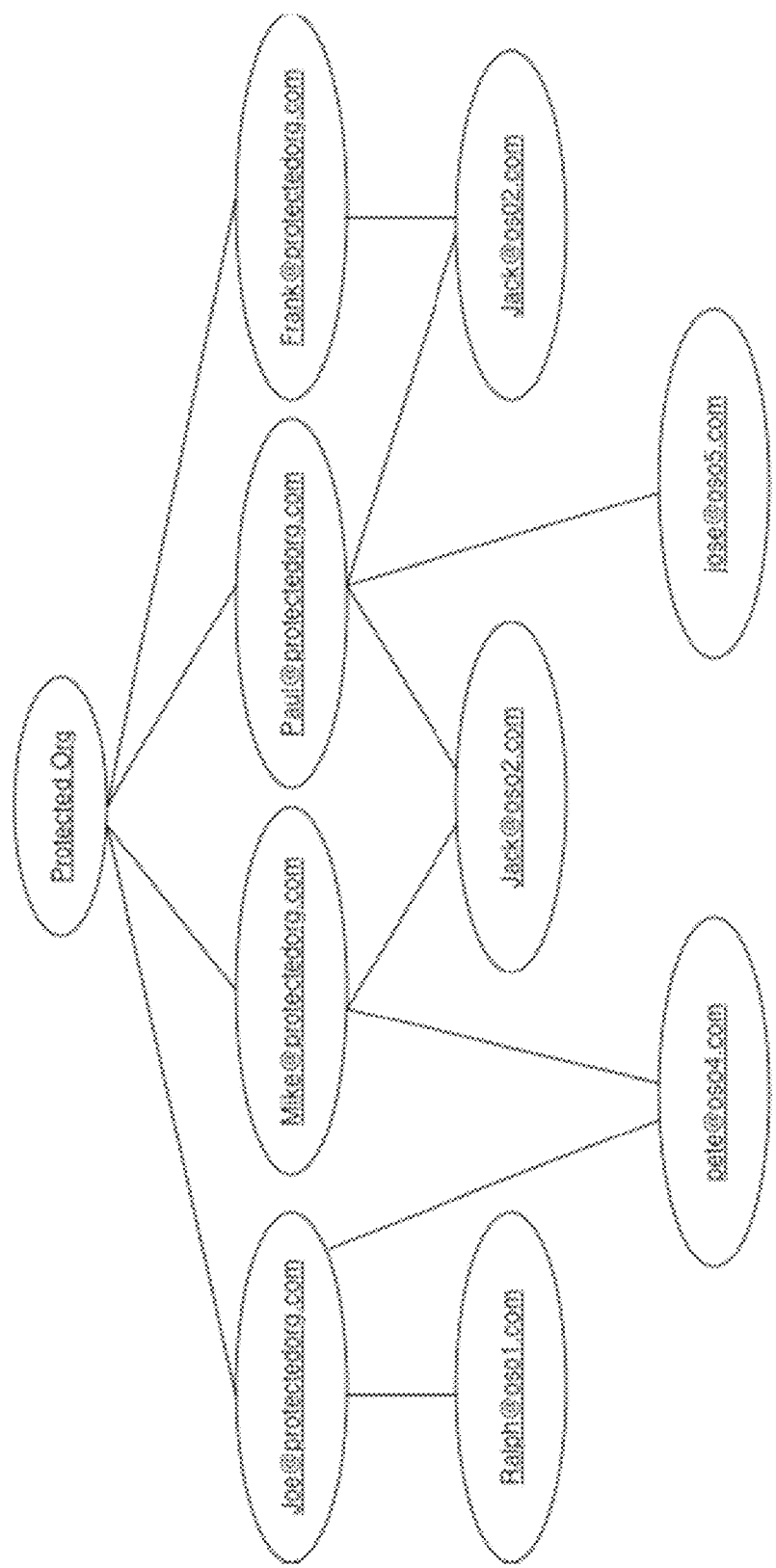
FIG. 3 is a graph representing relationships among email addresses in accordance with an aspect of the present disclosure.
Figure 4:
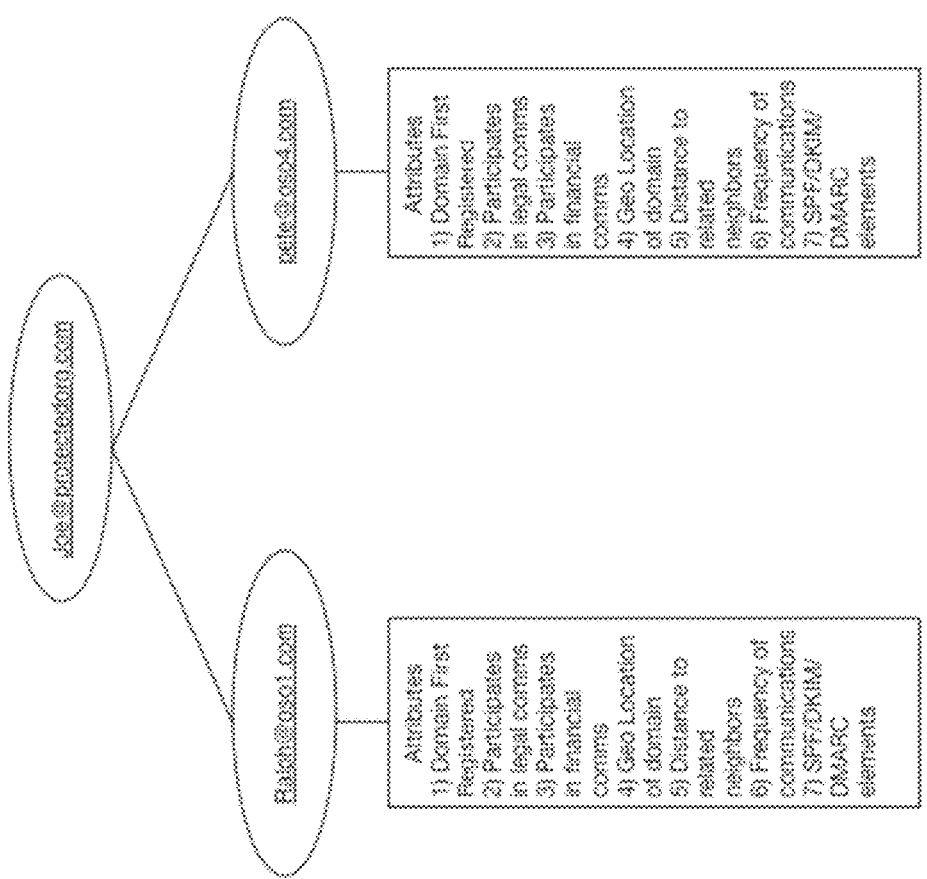
FIG. 4 is a graph representing relationships between email addresses, and their respective attributes, in accordance with an aspect of the present disclosure.

A social network graph database is created and installed on the same email server, or in an environment that requires large processing requirements, on a separate server with a hard drive, memory and disk space and is setup and is configured with social graph schema layouts as shown in FIGS. 1, 3 and 4.

A connector to Active Directory is built to dynamically pull the following information from Active Directory as email messages are received in order to add the following additional attributes to the nodes labeled Email_Address on the above-referenced graph schema in FIG. 1. This will be used to assist in the analysis of quarantined email messages that have been flagged and stopped for investigations. The connector is dynamically adjusted allowing for the mapping of different AD fields to the input fields of the social graph as deemed necessary. Additional custom fields can also be added as required if additional AD attributes would be valuable to include, for example: Last Name, First Name, Title, Group.

Individuals working for the protected company implementing this solution will pre-identify a target list of users who are considered "High Risk" and will maintain this user list in either a file for regularly scheduled uploading to the system or in an Active Directory group which will be monitored by the system for automatic tagging in the Social Network Graph. Users identified as "High Risk" will have the Boolean value of 1 set in the attribute called "High_Risk" on the Node in the graph database labeled "Email_Address."

The internal domain names of the protected company are defined in the setup configuration file for risk scoring purposes and analysis engine decision-making. Based on this configuration setting, as electronic communications occur, the Nodes in the graph labeled Email_Address will be labeled as either "Internal_Email_Address" or "External_Email_Address." Additionally, as the Nodes in the graph labeled Domain are created, the label "Internal_Domain" or "External_Domain" will be created on the graph element.

Figure 2:
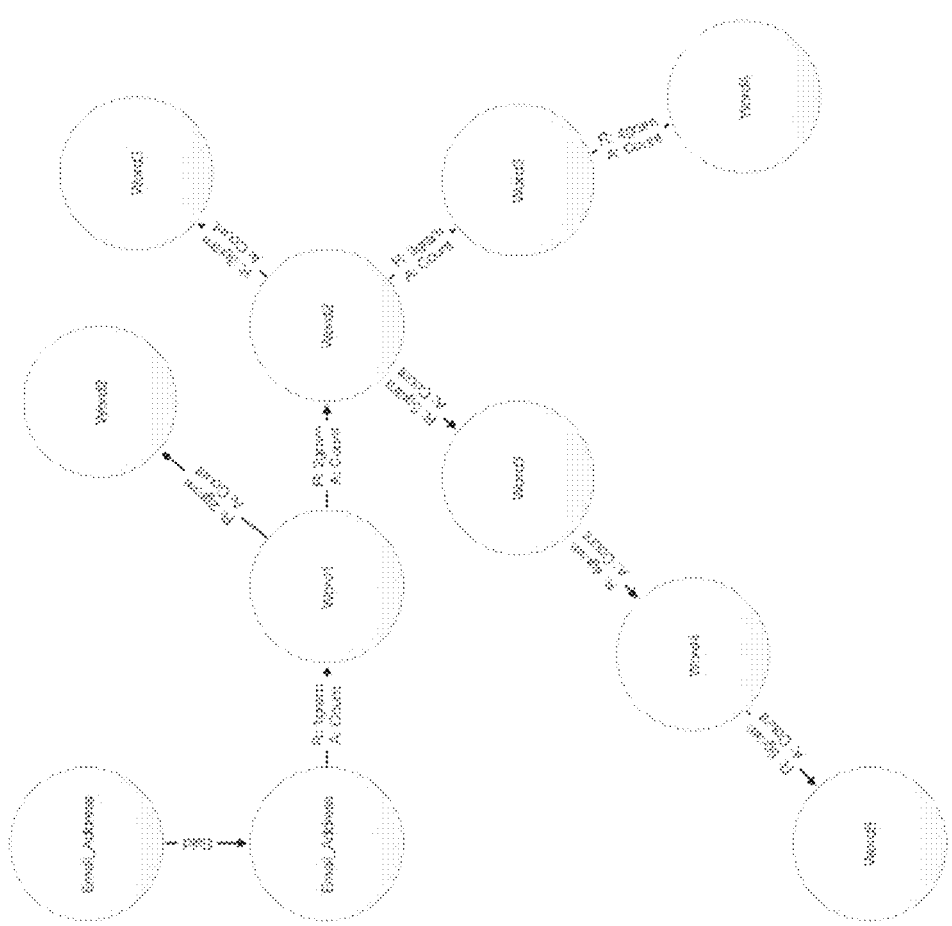
FIG. 2 is a content linguistics graph of words associated with communications between email addresses in accordance with an aspect of the present disclosure.

A content Linguistics graph database may be created and installed on the same email server, or in an environment that requires extremely large processing requirements, on a separate server with a hard drive, memory and disk space and is setup and is configured with the following social graph schema layouts as shown in FIG. 2.

As messages are transmitted through the system, the "Queue and Modify" Interface engine will collect email messages being received through the "Queue and Modify" API and will pass the messages to the content acquisition engines in parallel to extract the required information to perform the respective functions described in the following.

The content acquisition engines will extract/lookup/count/calculate the respective elements detailed below and will write the output of their work to the social network graph and the Linguistics graph as the appropriate data types in the schema detailed below. Associated relationships and counts will be calculated based on the schema diagrams from the above two diagrams for use in the risk score calculations and linguistic analytics.

Header_Extract Engine

The header extract engine will operate on email messages and extract the following data elements to be written to the social network graph element as detailed below.
- a. Sender: Email address of individual who sent the email message.
- b. Recipients: List of recipients the email message was sent to.
- c. CC List: Email addresses "Carbon Copied" on this message.
- d. Sender's Domain: The DNS domain name of the sender's email address.
- e. Recipient's Domain: The DNS domain name of the Recipient's email address.
- f. CC List Domains: The DNS domains of the email addresses CC'd on this message.
- g. Sender's Display Name: Display name value of the sender set in the headers of the email.

DNS_Extract Engine

The DNS extract engine will take the extracted elements from the Header_Extract engine's routine and will use the DNS resolver to query for specific record information used in the learning engine and risk classification process.
- a. SPF Record: Resolve the SPF DNS record for the sender's DNS domain.
- b. DMARC Record: Resolve the DMARC DNS record for the sender's DNS domain.
- c. DKIM Record: Resolve the DKIM record for the sender's DNS domain.
- d. Sender's Domain Registration Lifetime: Lookup the date the DNS domain record was first established.

Geo_Inquiry Engine

The Geo Inquiry engine will take the DNS domain of the sender and look up the geographical data elements of the communications.
- a. Country Code: Two-letter country code.
- b. US State: If the domain resides in a US state the two-letter state will be looked up.
- c. City: The city where the domain is registered.
- d. ISP: The Internet Service Provider the domain uses.
- e. Geo-Coordinates: The geographic coordinates of the location of the DNS domain.
- f. Time Zone: Time Zone in which the DNS domain is registered.

Distance_Calc Engine

The distance calculation engine evaluates deviations in several data elements, some of which may appear to be minor but could be significant. All of the senders' email addresses, domains and Display Names that have ever been senders to the recipient prior to this message where there have never been any prior communications from this source, will be evaluated looking for possible mimicking. When any one of a new email address, domain, or Display Name, is seen for the first time communicating with a recipient of the protected company, the Levenshtein distance (2) check algorithm will be applied looking for a distance difference of 1, 2, or 3 characters apart from any previous domain/email address/Display Name that has been in communication with this recipient previously to identify possible mimicking.

AD_Info Engine

The AD Info content acquisition engine communicates with the active directory to acquire the information set forth below. The AD_Info content acquisition engine can be configured to map different AD data values to corresponding fields in the data model to meet the AD schema design of the company.

a. First Name: Active directory attribute will be looked up.
    b. Last Name: Active directory attribute will be looked up.
    c. Title: Active directory attribute will be looked up.
    d. Group: Active directory attribute will be looked up Msg_Body_Extract Engine The message contents of the email communications contain communications attributes, will be profiled, learned, and stored to create the linguistic profile of the communications.

In order to create a parameterized breakdown of constructs used in communications, the message body will be analyzed and broken into Uni-Grams, Bi-Grams, Tri-Grams, Quad-Grams, and Quint Grams. This data will be stored in a graph database for predictive modeling. When the message is extracted it will be run through the following routines:

a. Message Start: As message communications occur often people communicate using the same styles. Message openings will be identified and profiled per sender to identify how a user traditionally starts out his communications to use for Ngram predictive analytics comparisons.
    b. Footer: In the same vein as message communications openings, people typically close out their messages the same way. Message ending lines and signature blocks will be identified and profiled per sender to identify how a user traditionally ends his communications to use for Ngram predictive analytics comparisons.
    c. Formality: As senders communicate, Ngram extraction of known formalities in communications will be identified and tagged.
    d. Message Body: The entire body of the email communications will be profiled creating Uni-Grams, Bi-Grams, Tri-Grams, Quad-Grams, and Quint Grams.
    e. Attachments: All documents that can have text extraction performed will be profiled creating Uni-Grams, Bi-Grams, Tri-Grams, Quad-Grams, and Quint Grams.
    f. Predictions: This phase of the learning behavior engine will take the data from the above described Ngram analytics, and will pass them to the text based analytics Bayesian (3) classifier which will take and apply corpuses of known communications linguistics and learned patterns as the training input data to proactively attempt to predict deviations and outliers in the types of communications occurring. As the communications are classified, they will feed back to the social graph tagging messages with the predicted communications classifiers, e.g., financial transactions, supply chain activity, header/footer mismatches, abnormal increases in the use of formality, etc.

The following table sets forth where information is gathered from and then stored.

| Data Element | Acquisition Engine | Content Acquisition Location | Graph Element |
|---|---|---|---|
| Sender | Header_Extract | SMTP Headers | Node |
| Recipients | | | Node |
| CC List | | | Node |
| Sender's Domain | | | Node |
| Recipient's Domain | | | Node |
| CC List Domains | | | Node |
| Sender Display Name | | | Property |
| SPF Record | DNS_Inquiry | Global DNS Records | Property |
| DMARC Record | | | Property |
| DKIM Record | | | Property |
| Sender's Domain Registration Lifetime | | | Property |
| Geo-Location of sender's domain | Geo_Inquiry | Geo Location Database | Property |
| Time Zone of sender's domain | | | Property |
| ISP of sender's domain | | | Property |
| Nearest social neighbor distance domain name | Distance_Calc_Domain | Levenshtein distance Algorithm | Relationship |
| Nearest social neighbor distance sender's email address | Distance_Calc_Sender | Levenshtein distance Algorithm | Relationship |
| Display Name Mirror | Display_Name_Mirror | Levenshtein distance Algorithm | Relationship |
| Msg_Count | Msg_Counter | Numeric Count | Relationship |
| 5 Ngrams | Body_Ngram5 | SMTP Body | Node |
| 4 Ngrams | Body_Ngram4 | | Node |
| 3 Ngrams | Body_Ngram3 | | Node |
| 2 Ngrams | Body_Ngram2 | | Node |
| 1 Ngram | Body_Ngram1 | | Node |
| 5 Ngrams | File_Ngram5 | Message Attachments (Text, PDF, Word, Excel, PPT) | Node |
| 4 Ngrams | File_Ngram4 | | Node |
| 3 Ngrams | File_Ngram3 | | Node |
| 2 Ngrams | File_Ngram2 | | Node |
| 1 Ngram | File_Ngram1 | | Node |

The following table sets forth the details of the content acquisition graph.

| Content Acquisition Engine | Email Data Element | Graph Element Type | Graph Object Name | Value Written to Graph Element | Explanation |
|---|---|---|---|---|---|
| Header_Extract | Sender | Node | Email_Address | Email address | Email address of the person who sent the message |
| AD_Info | | Attribute | High_Risk | Boolean (1 or 0) | Flat file or AD group check to identify users who are high risk. |
| Msg_Body_Extract | | Attribute | Header_Model | Name of header linguistics model | Each sender's profiled linguistic Ngram behavior model name for the start of their email messages. |
| Msg_Body_Extract | | Attribute | Signature_Model | Name of signature linguistics model | Each sender's profiled linguistic Ngram behavior model name for the end signature block of their email messages. |
| Msg_Body_Extract | | Attribute | Formality_Model | Name of formality linguistics model | An Ngram profile of the use of specific formal words in the sender's regular email communications. Not the attachments. |
| Msg_Body_Extract | | Attribute | Msg_Body_Model | Name of email message body linguistics model | Each sender's profiled linguistic Ngram behavior model name for the content body of their email messages. |
| Msg_Body_Extract | | Attribute | Msg_Att_Model | Name of email message attachments linguistics model | Each sender's profiled linguistic Ngram behavior model name for the content of their email attachments. |
| AD_Info | | Attribute | First_Name | Person's first name | Data gathered from AD connector |
| AD_Info | | Attribute | Last_Name | Person's last name | Data gathered from AD connector |
| AD_Info | | Attribute | Title | Person's title | Data gathered from AD connector |
| AD_Info | | Attribute | Group | Group person belongs to | Data gathered from AD connector |
| | | Attribute | Known_Bad | Boolean (1 or 0) | As cases are handled and marked true positive attribute will be set to 1. May also be a obtained by consulting a pre-supplied list of known bad senders for risk scoring |
| | | Label | Internal_Email_Address | Boolean (1 or 0) | Based on setup config protected domains list |
| | | Label | External_Email_Address | Boolean (1 or 0) | All non-protected domains are labeled external |
| | | Relationship | Domain_From | Points to: Sender's DNS Domain | Pointer to sender's DNS domain |
| | | Attribute | First_Seen | Date | First Date/time a communication was sent from this DNS domain |
| | | Attribute | Last_Seen | Date | Last Date/time a communication was sent from this DNS domain |
| | | Attribute | Count_Seen | Numeric Count | Total messages sent over time from this DNS domain |
| | | Relationship | Sent_To | Points to: Recipient's Email Addresses | Points to Recipient's Email Addresses |

-continued

| Content Acquisition Engine | Email Data Element | Graph Element Type | Graph Object Name | Value Written to Graph Element | Explanation |
|---|---|---|---|---|---|
| | | Attribute | First_Seen | Date | First Date/time a communication was sent to this Recipient's email address from this sender |
| | | Attribute | Last_Seen | Date | Last Date/time a communication was sent to this Recipient's email address from this sender |
| | | Attribute | Count_Seen | Numeric Count | Total messages sent over time to this Recipient's email address from this sender |
| Header_Extract | Recipient's Domain | Node | Domain | DNS Domain | DNS Domain Name of the Recipient's email addresses |
| | | Relationship | Domain_To | Points to: Recipient's DNS Domain | Recipient's DNS domain |
| | | Attribute | First_Seen | Date | First Date/time a communication was sent to this DNS domain from this sender |
| | | Attribute | Last_Seen | Date | Last Date/time a communication was sent to this DNS domain from this sender |
| | | Attribute | Count_Seen | Numeric Count | Total messages sent over time to this DNS domain from this sender |
| Distance_Calc | | Relationship | Away_1 | Points to: Email_Address | Points to all email addresses that are 1 character away from this sender's email address that have communicated with this recipient in the past (Levenshtein distance(2)) |
| Distance_Calc | | Relationship | Away_2 | Points to: Email_Address | Points to all email addresses that are 2 characters away from this sender's email address that have communicated with this recipient in the past (Levenshtein distance(2)) |
| Distance_Calc | | Relationship | Away_3 | Points to: Email_Address | Points to all email addresses that are 3 characters away from this sender's email address that have communicated with this recipient in the past (Levenshtein distance(2)) |
| | | Relationship | Displays | Points to: Display_Name | Pointer to the Display Name Node of the sender |
| Header_Extract | Sender Display Name | Node | Display_Name | Display_Name | The display name set in the headers from the sender |

-continued

| Content Acquisition Engine | Email Data Element | Graph Element Type | Graph Object Name | Value Written to Graph Element | Explanation |
|---|---|---|---|---|---|
| Distance_Calc | | Relationship | Away_1 | Points to: Display_Name | Points to all display names that are 1 character away from this sender's Display Name that have communicated with this recipient in the past (Levenshtein distance(2)) |
| Distance_Calc | | Relationship | Away_2 | Points to: Display_Name | Points to all display names that are 2 character away from this sender's Display Name that have communicated with this recipient in the past (Levenshtein distance(2)) |
| Distance_Calc | | Relationship | Away_3 | Points to: Display_Name | Points to all display names that are 3 character away from this sender's Display Name that have communicated with this recipient in the past (Levenshtein distance(2)) |
| Header_Extract | Recipients | Node | Email_Address | Email address | Email addresses of the people who received the message |
| Header_Extract | CC List | Node | Email_Address | Email address | Email addresses of the people who/where copied on the message |
| | | Relationship | CC'd | Points to: Email Addresses CC'd | Points to all Email Addresses CC'd in the communications |
| | | Attribute | First_CC | Date | First Date/time a communication was sent which CC'd this email address from this sender |
| | | Attribute | Last_CC | Date | Last Date/time a communication was sent which CC'd this email address from this sender |
| | | Attribute | Count_CC | Numeric Count | Total messages sent over time that CC'd this Recipient's email address from this sender |
| Header_Extract | Sender's Domain | Node | Domain | DNS Domain | DNS Domain Name from the sender's email address |
| DNS_Inquiry | | Attribute | SPF_Record | Boolean (1 or 0) | Check to see if a valid SPF DNS record exists for the Sender's DNS Domain |
| DNS_Inquiry | | Attribute | DKIM_Record | Boolean (1 or 0) | Check to see if a valid DKIM DNS record exists for the Sender's DNS Domain |
| DNS_Inquiry | | Attribute | DMARC_Record | Boolean (1 or 0) | Check to see if a valid DMARC DNS record exists for the Sender's DNS Domain |
| DNS_Inquiry | | Attribute | Domain_Reg_Date | Date | Date the DNS record for the Sender's DNS Domain was registered |

-continued

| Content Acquisition Engine | Email Data Element | Graph Element Type | Graph Object Name | Value Written to Graph Element | Explanation |
|---|---|---|---|---|---|
| Geo_Inquiry | | Attribute | Domain_Country | Country Code | Two letter country code in which the Sender's DNS Domain is registered |
| Geo_Inquiry | | Attribute | Domain_State | 2 Letter US State | If located in the US, the two letter code for the state in which the Sender's DNS Domain is registered |
| Geo_Inquiry | | Attribute | Domain_City | City | City in which the Sender's DNS Domain is registered |
| Geo_Inquiry | | Attribute | Domain_ISP | ISP | ISP the Sender's DNS Domain uses |
| Geo_Inquiry | | Attribute | Domain_Coordinates | Geographic Coordinates | Geographic coordinates for the Sender's DNS Domain |
| Geo_Inquiry | | Attribute | Domain_TZ | Time zone | Time Zone for the Sender's DNS Domain |
| | | Label | Internal_Domain | Boolean (1 or 0) | Based on setup config protected domains list |
| | | Label | External_Domain | Boolean (1 or 0) | Based on setup config protected domains list |
| Distance_Calc | | Relationship | Away_1 | Points to: Domain | Points to all DNS Domains that are 1 character away from this sender's email address DNS Domain that have communicated with this recipient in the past (Levenshtein distance(2)) |
| Distance_Calc | | Relationship | Away_2 | Points to: Domain | Points to all DNS Domains that are 2 characters away from this sender's email address DNS Domain that have communicated with this recipient in the past (Levenshtein distance(2)) |
| Distance_Calc | | Relationship | Away_3 | Points to: Domain | Points to all DNS Domains that are 3 characters away from this sender's email address DNS Domain that have communicated with this recipient in the past (Levenshtein distance(2)) |
| Header_Extract | CC List Domains | Node | Domain | DNS Domain | DNS Domain Name of anyone CC'd on the email |
| | | Relationship | CC_Domain | Points to: DNS Domains of CC'd email addresses | Points to all DNS Domains CC'd in the communications |
| | | Attribute | First_CC | Date | First Date/time a communication was sent which CC'd this DNS Domain from this sender |
| | | Attribute | Last_CC | Date | Last Date/time a communication was sent which CC'd this DNS Domain from this sender |

| Content Acquisition Engine | Email Data Element | Graph Element Type | Graph Object Name | Value Written to Graph Element | Explanation |
|---|---|---|---|---|---|
| | | Attribute | Count_CC | Numeric Count | Total messages sent over time that CC'd this Recipient's DNS Domain from this sender |

Referring now to FIG. 4, when the header and body information is retrieved, the relationship graph can be populated with the respective information.

In operation, initially, and for a predetermined period of time, for example, 90 days, the system will be configured to run in a "learning only mode." This will provide the Social Network communications graph relationships and the content linguistics a sufficient amount of time to build out. Of course, depending on, for example, the volume of email or the need to have a system in place, the initial time period could be longer or shorter.

Once the learning time period has been completed, the system will be put into prevent mode or alert mode depending on the desires of the implementers. Prevent mode will be used to stop and hold suspicious email messages meeting the risk scoring thresholds. Alert mode will allow all messages to pass but will keep copies of messages triggering alerts for investigators to follow up on.

As the system operates, all of the learned behavioral details of new electronic communications are compared in real time to the historical communications looking for the indications of both insider threat behavior and humans attempting to impersonate existing externally trusted relationships. In order to detect the behaviors, the risk scoring engine will be configured in such a way that the scores of each individual parameter check can be completely customized, whitelisted, blacklisted or turned off, for certain scenarios of combinations of data elements collected. This could be customized to also include specific DNS domain name exclusions as well as specific email address exclusions.

The risk scoring engine may be maintained in a separate configuration file through a GUI interface used to set the risk scores and exclusions for each data element as messages are processed. The risk score adjustments can be done on the fly through the user interface of the system and will dynamically be adjusted in the system in a real time fashion without having to stop or restart processes.

In one implementation, the risk scores will be configured initially, for example, as follows:

| Risk score parameters | Score | Notes |
|---|---|---|
| Recipients receiving external communications that are classified as high risk users | 100 | |
| No SPF DNS record | 100 | |
| No DMARC DNS record | 100 | |
| No DKIM DNS record | 100 | |
| Net new sending domain registration lifetime check. Score starts at 5000 and decrements total risk points by 1 per day in age based on registration lifetime. | 5000 | Subtract 1 risk point for each day old based on domain registration lifetime, e.g., a 10 day old domain = 4990 (5000 − 10) points, 500 day old domain = 4500 (5000 − 500) points. Specific domains can be excluded from this check. Gmail.com, for example, may be excluded. Free email providers are not good candidates for this check. |
| Free email provider used and is first communication to occur from this sender to anyone in the protected company | 1000 | |
| Free email provider used and is first communication to occur from this sender to specific recipient. | 1000 | If an email address from a free email provider is sending to recipients in the protected company and is actively participating in communications over time this will be decremented by the total bi-directional communication counts. If, for example, 700 emails have been sent from the protected company to the email address in question, then the score will be 300 (1000 − 700). |
| Geo location of sending domain outside social network communications circle | 40 | Check to see if recipient communicates with individuals in this geographic location. |
| Geo location of sending domain outside all protected companies social circles | 100 | Check to see if anyone in the protected company communicates with individuals in this geographic location. |

-continued

| Risk score parameters | Score | Notes |
|---|---|---|
| ISP of sending domain outside social network communications circle | 40 | Check to see if recipient communicates with other individuals using this ISP |
| ISP of sending domain outside all protected companies social circles | 100 | Check to see if anyone in the protected company communicates with other individuals using this ISP |
| Distance test 1 character different than existing email addresses existing in social network | 1000 | Levenshtein distance test to identify possible mimicking of sender's email address |
| Distance test 2 characters different than existing email addresses existing in social network | 800 | Levenshtein distance test to identify possible mimicking of sender's email address |
| Distance test 3 characters different than existing email addresses existing in social network | 600 | Levenshtein distance test to identify possible mimicking of sender's email address |
| Distance test 1 character different than existing DNS domain existing in social network | 500 | Levenshtein distance test to identify possible mimicking of sender's DNS domain |
| Distance test 2 character different than existing DNS domain existing in social network | 400 | Levenshtein distance test to identify possible mimicking of sender's DNS domain |
| Distance test 3 character different than existing DNS domain existing in social network | 300 | Levenshtein distance test to identify possible mimicking of sender's DNS domain |
| Distance test 1 character different than existing display name existing in social network | 250 | Levenshtein distance test to identify possible mimicking of sender's display name in email messages |
| Distance test 2 character different than existing display name existing in social network | 200 | Levenshtein distance test to identify possible mimicking of sender's display name in email messages |
| Distance test 3 character different than existing display name existing in social network | 150 | Levenshtein distance test to identify possible mimicking of sender's display name in email messages |
| First ever seen communications from sender email address in Recipient's social network | 100 | |
| First time seen communications from sender@domain to protected company | 1000 | |
| First time seen communications from @domain to protected company | 1000 | |
| Linguistics Model Analytic: Sender header deviation | 250 | Variable scoring model. Max score is 250. A normalized behavior curve will be learned and a standard scoring curve will be used. 0 = 100% the same, 250 = 100% different than what is normally used in the header of emails for this sender. Uses Levenshtein distance algorithm to calculate differential. |
| Linguistics Model Analytic: Sender signature block deviation | 400 | Variable scoring model. Max score is 400. A normalized behavior curve will be learned and a standard scoring curve will be used. 0 = 100% the same, 400 = 100% different than what is normally used in the signature block for this sender. Uses Levenshtein distance algorithm to calculate differential. |
| Linguistics Model Analytic: Sender use of formality deviation | 1000 | Variable scoring model. Max score is 1000. A normalized behavior curve will be learned and a standard scoring curve will be used. 0 = no increase in the use of learned formality, 1000 = capped curve of complete deviation in the increase or decrease of the use of formality either never used before, or being dramatically over or under used by this sender in the message body. Uses Ngrams for extraction and Levenshtein for analytic normalization. |

-continued

| Risk score parameters | Score | Notes |
|---|---|---|
| Linguistics Model Analytic: Message body context labeling | 1000 | Customized variable scoring model per communications context type. Initial communications context types developed will be focused on financial transactions in supply chain transactions. Pre-supplied corpus material used to train predictive model and are coupled with example data provided by customer to strengthen accuracy. 0 = 0% probability communication related to financial transactions, 1000 = extremely high probability communication is related to financial transactions. Uses Ngrams and Bayesian algorithm for probability determination. |
| Linguistics Model Analytic: Attachment context labeling | 1000 | Customized variable scoring model per communications context type. Initial communications context types developed will be focused on financial transactions in supply chain transactions. Pre-supplied corpus material used to train predictive model and are coupled with example data provided by customer to strengthen accuracy. 0 = 0% probability attachment related to financial transactions, 1000 = extremely high probability attachment is related to financial transactions. Uses Ngrams and Bayesian algorithm for probability determination. |
| Linguistics Model Analytic: High probability of identity conveyance | 500 | Variable scoring model. Max score is 500. A normalized behavior curve will be learned and a standard scoring curve will be used. 0 = no indication of communication indicators used to convey a trusted identity, 500 = significant use of communications indicators used to convince someone they are who they say they are for this sender. Uses Ngrams and Bayesian algorithm for probability determination. |

Based on the foregoing, the passing or blocking of emails will occur based on one or more of the following steps:

1. Evaluating an email's cumulative score to determine message processing.
2. Determining initial risk points review criteria based on 90 day learned behavioral profiling and organizational tolerance for scoring.
3. Quarantining, or otherwise isolating, messages that are over the organizational tolerance level of risk points going forward for later manual review or modifying the message to send to recipients with a warning indicator of risk score data.
4. Passing on to the designated recipient those messages that are under the threshold.
5. Reviewing messages to determine validity.
6. Analysts reviewing held messages for legitimacy and making a decision as to handling.
7. Documenting message deemed to be legitimate and releasing them from quarantine to be passed on to recipients.
8. Preserving, but not passing along, "true" positives, i.e., those emails deemed to be an impersonation/insider threat, and a copy of the full message is preserved for forensic evidence.
9. Blocking and logging all future communications from the threat-identified or fraudulent sending party's domain or email address.
10. Setting the Boolean flag value to 1 in the social graph marking the fraudulent email address as a known malicious email address for future risk scoring consideration.
11. Passing collected intelligence back to a central service to share fraudulent emails anonymously with others to identify widespread attacks.

Various embodiments of the above-described systems and methods may be implemented in digital electronic circuitry, in computer hardware, firmware and/or software. The implementation can be as a computer program product, i.e., a computer program tangibly embodied in an information carrier. The implementation can, for example, be in a machine-readable storage device and/or in a propagated signal, for execution by, or to control the operation of, data processing apparatus. The implementation can, for example, be a programmable processor, a computer and/or multiple computers.

While the above-described embodiments generally depict a computer implemented system employing at least one processor executing program steps out of at least one memory to obtain the functions herein described, it should be recognized that the presently described methods may be implemented via the use of software, firmware or alternatively, implemented as a dedicated hardware solution such as in an application specific integrated circuit (ASIC) or via any other custom hardware implementation.

A computer program can be written in any form of programming language, including compiled and/or interpreted languages and the computer program can be deployed in any form, including as a stand-alone program or as a subroutine, element and/or other unit suitable for use in a computing environment. A computer program can be deployed to be executed on one computer or on multiple computers at one site.

Method steps can be performed by one or more programmable processors executing a computer program to perform functions of the invention by operating on input data and generating output. Method steps can also be performed by and an apparatus can be implemented as special purpose logic circuitry. The circuitry can, for example, be an FPGA (field programmable gate array) and/or an ASIC (application-specific integrated circuit). Modules, subroutines and software agents can refer to portions of the computer program, the processor, the special circuitry, software and/or hardware that implements that functionality.

Processors suitable for the execution of a computer program include, by way of example, both general and special purpose microprocessors and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer can include, can be operatively coupled to receive data from and/or transfer data to one or more mass storage devices for storing data, e.g., magnetic, magneto-optical disks or optical disks.

Data transmission and instructions can also occur over a communications network. Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM and/or DVD-ROM disks. The processor and the memory can be supplemented by and/or incorporated in special purpose logic circuitry.

To provide for interaction with a user, the above described techniques can be implemented on a computer having a display device. The display device can, for example, be a cathode ray tube (CRT) and/or a liquid crystal display (LCD) monitor. The interaction with a user can, for example, be a display of information to the user and a keyboard and a pointing device, e.g., a mouse or a trackball by which the user can provide input to the computer, e.g., interact with a user interface element. Other kinds of devices can be used to provide for interaction with a user. Other devices can, for example, be feedback provided to the user in any form of sensory feedback, e.g., visual feedback, auditory feedback or tactile feedback. Input from the user can, for example, be received in any form, including acoustic, speech and/or tactile input.

The above described techniques can be implemented in a distributed computing system that includes a back-end component. The back-end component can, for example, be a data server, a middleware component and/or an application server. The above described techniques can be implemented in a distributing computing system that includes a front-end component. The front-end component can, for example, be a client computer having a graphical user interface, a Web browser through which a user can interact with an example implementation and/or other graphical user interfaces for a transmitting device. The components of the system can be interconnected by any form or medium of digital data communication, e.g., a communication network. Examples of communication networks include a local area network (LAN), a wide area network (WAN), the Internet, wired networks and/or wireless networks.

The system can include clients and servers. A client and a server are generally remote from each other and typically interact through a communication network. The relationship of client and server arises by virtue of computer programs running on the respective computers and having a client-server relationship to each other.

The invention claimed is:

1. An apparatus for characterizing communications going to and from a first domain, the apparatus comprising:
   a processor; and
   a memory containing program instructions executed by the processor to cause the processor to manage a fraudulent communications detection system and to, for a predetermined time period, obtain each communication going to and from the first domain and, for each obtained communication:
      analyze one or more parameters of the obtained communication;
      store the analyzed one or more parameters of the obtained communication with respect to a sender of the obtained communication and one or more recipients of the obtained communication;
      identify one or more relationships among the sender and the one or more recipients of the obtained communication;
      extrapolate and characterize each of the identified one or more relationships as a function of the analyzed one or more parameters;
      associate a direction value with each stored relationship and characterization indicating one of: the respective relationship or characterization is directed to the first domain or is coming from the first domain; and
      update a store of the extrapolated relationships and associated characterizations of communications among the sender and the one or more recipients of the obtained communication,
   wherein the store of extrapolated relationships and associated characterizations of communications among the sender and the one or more recipients is operative to improve operation of the fraudulent communications detection system associated with the processor.

2. The apparatus of claim 1, wherein the memory further comprises program instructions to cause the processor to analyze one or more of:
   a linguistic pattern of the obtained communication;
   a date and time of the obtained communication;
   a DNS domain of the obtained communication;
   a display name associated with the sender of the obtained communication; and
   geographic information of the DNS domain of the obtained communication.

3. The apparatus of claim 2, wherein the memory further comprises instructions to cause the processor to analyze at least one of:

spelling characteristics of content of the obtained communication;
salutation characteristics of the obtained communication; and
closing characteristics of the obtained communication.

4. The apparatus of claim 1, wherein the memory further comprises program instructions to cause the processor to characterize at least one of the extrapolated relationships among the sender and the one or more recipients of the obtained communication as one of a social network or a business network.

5. The apparatus of claim 1, wherein the memory further comprises program instructions to:
determine and store risk scores for setting at least one of:
an alerting threshold value,
a notification threshold value, and
a communications labeling threshold value.

6. The apparatus of claim 1, wherein each obtained communication is one of:
an email communication;
a spoken communication; or
an electronic document containing machine-readable text.

7. The apparatus of claim 1, wherein the memory further comprises program instructions to cause the processor to analyze and establish relationships among items in the obtained communication, wherein an item is one of:
phonemes;
syllables;
characters;
words; or
base pairs.

8. The apparatus of claim 7, wherein the memory further comprises program instructions to cause the processor to:
compare the items to a corpus database; and
connect a label to the obtained communication as a function of the comparison.

9. An apparatus for characterizing a communication going to or coming from a first domain, the apparatus comprising:
a processor; and
a memory containing program instructions executed by the processor to cause the processor to manage a fraudulent communications detection system and, for the communication going to or coming from the first domain, to:
analyze one or more parameters of the communication;
identify one or more relationships among the sender and the one or more recipients of the communication;
extrapolate and characterize each of the identified one or more relationships as a function of the analyzed one or more parameters;
compare the analysis of the one or more parameters and the extrapolated and characterized relationships to a store of extrapolated relationships and associated characterizations of previously received or sent communications associated with the first domain;
generate a risk score for the communication as a function of the comparison to the stored relationships and associated characterizations; and
process the communication as a function of a comparison of the generated risk score to one more predetermined threshold values comprising:
an alerting threshold value,
a notification threshold value, and
a communications labeling threshold value,
wherein the memory further comprises program instructions to cause the processor to:
determine a direction value for each of the identified one or more relationships and characterizations, the direction value indicating one of: the respective relationship or characterization is directed to the first domain or is coming from the first domain;
compare the analysis of the one or more parameters, the determined direction values and the extrapolated and characterized relationships to the store of extrapolated relationships and associated characterizations of previously received or sent communications associate associated with the first domain, wherein the store includes the direction value associated with each stored relationship and characterization; and
generate the risk score as a function of the comparison to the stored relationships, associated characterizations and direction values.

10. The apparatus of claim 9, wherein the memory further comprises program instructions to cause the processor to analyze one or more of:
a linguistic pattern of the communication;
a date and time of the communication;
a DNS domain of the communication;
a display name associated with the sender of the communication; and
geographic information of the DNS domain of the communication.

11. The apparatus of claim 10, wherein the memory further comprises program instructions to cause the processor to analyze at least one of:
spelling characteristics of content of the communication;
salutation characteristics of the communication; and
closing characteristics of the communication.

12. The apparatus of claim 9, wherein the communication is one of:
an email communication;
a spoken communication; or
an electronic document containing machine-readable text.

13. The apparatus of claim 9, wherein the memory further comprises program instructions to cause the processor to analyze and establish relationships among items in the communication, wherein an item is one of:
phonemes;
syllables;
characters;
words; or
base pairs.

* * * * *